United States Patent [19]

Bell

[11] Patent Number: 5,134,887
[45] Date of Patent: Aug. 4, 1992

[54] PRESSURE SENSORS

[76] Inventor: Robert L. Bell, 5960 Grey Rock Rd., Agoura Hills, Calif. 91301

[21] Appl. No.: 410,995

[22] Filed: Sep. 22, 1989

[51] Int. Cl.$^5$ .............................................. G01L 9/12
[52] U.S. Cl. ........................................ 73/718; 73/724; 73/756; 361/283
[58] Field of Search ............... 73/724, 718, 717, 716, 73/756; 361/283

[56] References Cited

U.S. PATENT DOCUMENTS

| | | | |
|---|---|---|---|
| 2,999,385 | 9/1961 | Wolfe | 73/718 |
| 3,800,413 | 4/1974 | Frick | 29/592 |
| 4,086,815 | 5/1978 | Asano et al. | 73/721 |
| 4,177,496 | 12/1979 | Bell et al. | 361/283 |
| 4,370,890 | 2/1983 | Frick | 73/718 |
| 4,388,668 | 6/1983 | Bell et al. | 361/283 |
| 4,389,895 | 6/1983 | Rud, Jr. | 73/724 |
| 4,458,537 | 7/1984 | Bell et al. | 73/718 |
| 4,670,733 | 6/1987 | Bell | 338/36 |
| 4,833,920 | 5/1989 | Knecht et al. | 73/724 |

Primary Examiner—Donald O. Woodiel
Attorney, Agent, or Firm—Merchant, Gould, Smith, Edell, Welter & Schmidt

[57] ABSTRACT

A capacitive force responsive transducer provides a linear relationship between electrical output and input force variations while protecting the sensing diaphragm from damage during extremely high overload forces. In one example differential pressures or forces are applied to opposite sides of a diaphragm interposed between two supporting plates, such that the diaphragm deflects toward one supporting plate and away from the other. Electrodes on opposite sides of the diaphragm are moved oppositely toward or away from facing electrodes on the supporting plates. A fourth order deflection curve machined into both surfaces of the diaphragm assures very linear capacitance variations (1/c) with the input differential pressures. Other electrodes are disposed in positions to provide invariant reference capacitors. At overload differential pressures, the diaphragm surface becomes flat and engages a supporting plate. A method of forming the fourth order "deflection curve" surfaces into the diaphragm uses a precision flat grinder in combination with fixtures that cause the diaphragm to deflect under internal pressure into the grinding or lapping surfaces. Successive grinding steps remove surface areas of the deflected diaphragm until a flat condition is achieved in the curved surface. On removal of the diaphragm from the fixture and release of internal pressure, the diaphragm assumes a final "fourth order" shape.

24 Claims, 12 Drawing Sheets

DIFFUSED PRT ELEMENT

PRESSURE SENSORS

BACKGROUND OF THE INVENTION

Various capacitive transducers for pressure measurement are well known in the art. Most of the differential pressure transducers include a central diaphragm interposed between two massive reference plates, with electrodes on both reference plates overlaying the central metallic diaphragm or overlaying deposited conductive films on each side. Most also employ peripheral seals that join and seal the diaphragm and reference plates together. There are two classes of capacitive transducers which measure low differential forces or pressures in the presence of high line pressures which can cause overload conditions hundreds of times more severe than the full scale loading of the transducer with its normal low differential pressure input. While both of these classes protect against damage from this overload condition, none of the prior art devices realize desirable levels of linearity and the low cost manufacturing capabilities due to the "fourth order" deflection curved shape formed by the diaphragms under pressure.

The fourth order deflection curve arises from the fact that the diaphragm is fixed about its periphery so that when pressure is applied against its surface within the periphery the resultant curvature changes from convex to concave, viewed from the pressure side and proceeding inwardly from the periphery to the center. Workers in the art have recognized that this compound curvature causes the spacing between areal electrodes to be non-uniform at any pressure, and also to introduce non-linearity in the capacitance variations with pressure. Resolution of the problem, however, has not been realized.

Prior art differential transducers of the first class are described in U.S. Pat. No. 2,999,385 to Wolfe, U.S. Pat. No. 3,800,413 to Frick, and U.S. Pat. No. 4,458,537 to Bell et al. All of these transducers provide protection against overload damage by supporting the diaphragm with a backup surface. The patent to Wolfe discloses a concave surface machined into each reference plate using standard "second order optical" techniques. Since this type of parabolic support does not match the deflection curve of the diaphragm, this design relies upon the plastic, inelastic properties of the metal diaphragm to absorb the potentially destructive forces that exist under overload conditions without full support. The nonlinearity inherent in the output of a transducer with concave reference plate surfaces is also well known. The Frick patent also discloses the same configuration as discussed in Wolfe and therefore suffers from the same deficiencies. Frick makes substantial use of melted glass formed into a metal cavity, machined to concave curvature and then provided with a deposited metal electrode. Leads connecting these electrodes to the electronic circuit serve the dual purpose of providing oil filling tubes.

The Bell et al patent, U.S. Pat. No. 4,458,537, discloses an approximate fourth order backup surface on the reference plates that is formed by screening a dielectric glass material on each reference plate to create islands of glass that are to support the diaphragm under overload conditions. Also, since the dielectric constant of the cover glass is four to five times that of the oil fill, there is improvement in the nonlinearity of its capacitive output. However, the fluid dynamics of the screen printing process causes dogbone shapes in the screened glass when fired. Also, bubbles can introduce domes of thin glass that are burst during the overload event, leaving particles of relatively high dielectric constant to move randomly throughout the oil filled cavities and therefore cause erroneous capacitive outputs. Finally, the accuracy of screen printing is limited to ±2 microns, which is not sufficiently precise to provide protection for brittle ceramic diaphragms used in the transducer.

The second class of prior art differential pressure transducers uses backup techniques external to the central diaphragm, dual reference plate structure. Specifically, they support isolation diaphragms that separate the oil fill transducer cavities from the pressure media being measured. U.S. Pat. Nos. issued to Fuji (4,086,815) and Bell (4,670,733) are representative of this class of transducer. The Fuji transducer uses a floating central cell that contains the sensing diaphragm and the two reference plates. A relatively flexible suspension diaphragm supports this central cell inside a housing, together with thick sections that serve as backup to the isolation diaphragms. The isolation diaphragms themselves form one side of a cavity which is oil filled to transmit the pressure from the isolation diaphragms to the central sensing cell. As the normal differential pressures are applied the entire central cell moves away from the higher pressure side, being allowed to do so by the relatively flexible suspension diaphragm. The measuring diaphragm still senses most of the differential pressure since it is hydraulically in parallel with the suspension diaphragm. Under low overload conditions, the suspension diaphragm has moved sufficiently far to remove all of the oil from between the isolation diaphragm, so that it is protected. Since flat surfaces are used in the central cell, linearity is quite poor. More importantly, this type of construction is very expensive to manufacture.

The Bell patent, U.S. Pat. No. 4,670,733, discloses a transducer with very small oil fill volumes that provide protection by carefully managing the oil fill volumes associated with the isolation diaphragm cavity. During normal conditions the isolation diaphragms "float" fully on the oil underneath them. At approximately two times the normal maximum differential pressure, the volume of oil transferred to the central sensing diaphragm cavity has "purged" essentially all of the oil under the isolation diaphragms, thereby preventing further overload from affecting the ceramic sensing diaphragm. Significant complexity is thereby introduced into the oil filling process as well as into the precision machined parts that contribute to the oil volumes that must be managed carefully.

Bell et al U.S. Pat. No. 4,177,496 refers, in conjunction with a dual facing diaphragm structure using opposed diaphragm plates, to variations that can be made in the plate shapes. After suggesting that the plates can be made thicker on one edge than another (to define the interdiaphragm spacing) it is also said that they "could be formed in the shape of a disk, concave surface, or a shape essentially same as the deflection curve of the plate(s) or disc(s) under pressure." Substantially identical language is found also in Bell et al U.S. Pat. No. 4,388,668. In this structure opposed flat surfaces are deflected toward or away from each other in response to pressure variations, the gap being of the order of 20 to 500 microns. The statement referred recognizes, as was generally known in the art that nonlinearities arise because of the compound curvature induced in a centrally deflected edge bound structure. However, there is asymmetry in the planar diaphragm as shown, so that the actual deflections would vary asymmetrically as well. Moreover, there is no definition of where the curvatures would be provided or how they would interrelate when both plates are deflected. These considerations, coupled with the fact that there is no disclosure of how such a curvature could be realized in practice, establishes that the brief reference teaches only what was already known, regarding curved concave surfaces in Wolfe and Frick.

Therefore there is significant need for a new differential capacitive transducer that offers better support for brittle (for example, ceramic) sensing diaphragms, that improves the linearity of the output, is easily manufactured using low cost manufacturing techniques, and improves the 1% or greater shift that presently occurs during initial overload conditions.

One field that needs these improvements is process control, especially those applications that use differential transducers that measure flow for billing purposes at custody transfer points. In such an application a 2% error induced by a one-sided overload can cost seller or buyer thousands of dollars over a relatively short time. Other applications that involve quality control monitoring and level monitoring are no less important in this field.

The problems of nonlinearity and high overload protection in differential pressure transducers also extend to single-sided devices for sensing gauge or absolute pressures, and for sensing loads generated by other than fluid pressures. As the art has progressed the demands for sensitivity, linearity and robustness of design have correspondingly increased but have not been met.

SUMMARY OF THE INVENTION

In accordance with the present invention, a diaphragm incorporates an electrode or sensor bearing surface concavity following a fourth order deflection curve on one or both sides. When the diaphragm is distorted under pressure or load the concavity moves increasingly toward parallelism with the facing reference surface. Consequently the gap between the opposed surfaces becomes more and more uniform throughout the area of interest. If the opposed surfaces bear electrodes, linearity in the capacitance variation is improved and the sensing range broadened. Moreover, at a deflection limit the flat reference surface serves as a mechanical stop to prevent overload from causing a failure of the diaphragm.

In accordance with this invention, a capacitive differential transducer includes separate capacitors which differentially change their values in opposite senses in response to a differential pressure input and a third capacitor which is substantially unaffected by differential pressure variations. In general, the central diaphragm has "fourth-order deflection" cavities machined into both sides and electrodes are centrally deposited inside these cavities. Rigid flat reference plates are disposed on each side of the diaphragm, with deposited electrodes overlaying the electrodes on the diaphragm. The diaphragm is attached to the reference plates at the periphery with a very thin seal, such seal being in the range of 0 to 10 microns while the maximum depths of the cavity in the diaphragm are in the range of 5 to 50 microns. The attachment to massive reference plates on each side secures the periphery against deflection under the forces applied. Deflection of the interior region of the diaphragm therefore increases the gap between the capacitive electrodes on the high pressure side, while reducing the gap between the two electrodes on the low pressure side. Reference electrodes on the diaphragm in the peripheral region also face reference electrodes on each reference plate and the two electrodes on the diaphragm that face these reference plate electrodes are electrically connected, such reference plate electrodes forming a substantially constant reference capacitor. Electronic circuits utilize one of the differentially changing capacitors and the reference capacitor to produce a very linear, precise output. Other advanced circuits can use both differential capacitor changes and/or the reference capacitor to provide linear output. In both configurations, the linearity of the output is greatly enhanced by the "deflection-curve" cavities in the central sensing diaphragm. Under overload conditions the diaphragm surface on the low pressure side becomes essentially planar and is substantially supported by the flat reference plate surface.

Another feature in accordance with the invention resides in the use and disposition of a ceramic transducer cell within a metal housing by compliant rings having reentrant or S-shaped cross section. The rings have greater compliance in the radial or diaphragm plane direction than in the perpendicular or central axis direction. A ring couples each axial end of the transducer cell to the metal housing, thus decoupling the cell from the substantial radial displacement forces exerted by the housing in response to pressure and temperature changes. In addition, high axial overload pressures and their resultant forces can be tolerated without inducing high bending stresses on the cell.

Methods in accordance with the invention fabricate ceramic diaphragms so that they incorporate fourth order deflection curves having the needed degree of precision. The diaphragms, having initially flat parallel surfaces, are releasably retained on one side of a pressurable securement fixture, with their upper side being unobstructed. When pressurized on the fixture side to a preselected level, the diaphragm deforms outwardly. A precision grinder capable of grinding flat surfaces to high precision removes the uppermost surface of the upwardly deflected material from the deformed diaphragm until a final flat surface is attained. When the pressure is relieved and the diaphragm removed from the fixture the relaxed diaphragm incorporates the desired fourth order deflection curve. Thereafter the other side may be similarly processed if desired. Electrodes may then be deposited and the diaphragm incorporated in a transducer cell.

It is not always cost convenient or mechanically necessary to apply pressure to opposite sides of a single diaphragm. Curve compensated transducers in accordance with the invention are sufficiently precise, however, to be used in side by side relation to derive differential pressure measurements. While minute thickness and other dimensional differences exist between the side by side diaphragms, these are substantially compensated by the grinding process.

A single sided transducer in accordance with the invention incorporates a diaphragm with a concave fourth order deflection curve on the side opposite the pressure side. This diaphragm uses an outward facing flange structure to keep tensile stresses away from the joints sealing the diaphragm to the reference plate. Additionally, this flange determines the diaphragm's active radius in both the machining process and in the final transducer structure. An isolation diaphragm and oil fill may be used or not, but the opposed reference surface is typically flat and serves as a backup against overload. Advantageously, in a capacitive sensing version of this invention the reference surface may incorporate a glass spacer film facing the diaphragm, to prevent electrical shorting of the sensing capacitor during overload conditions.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
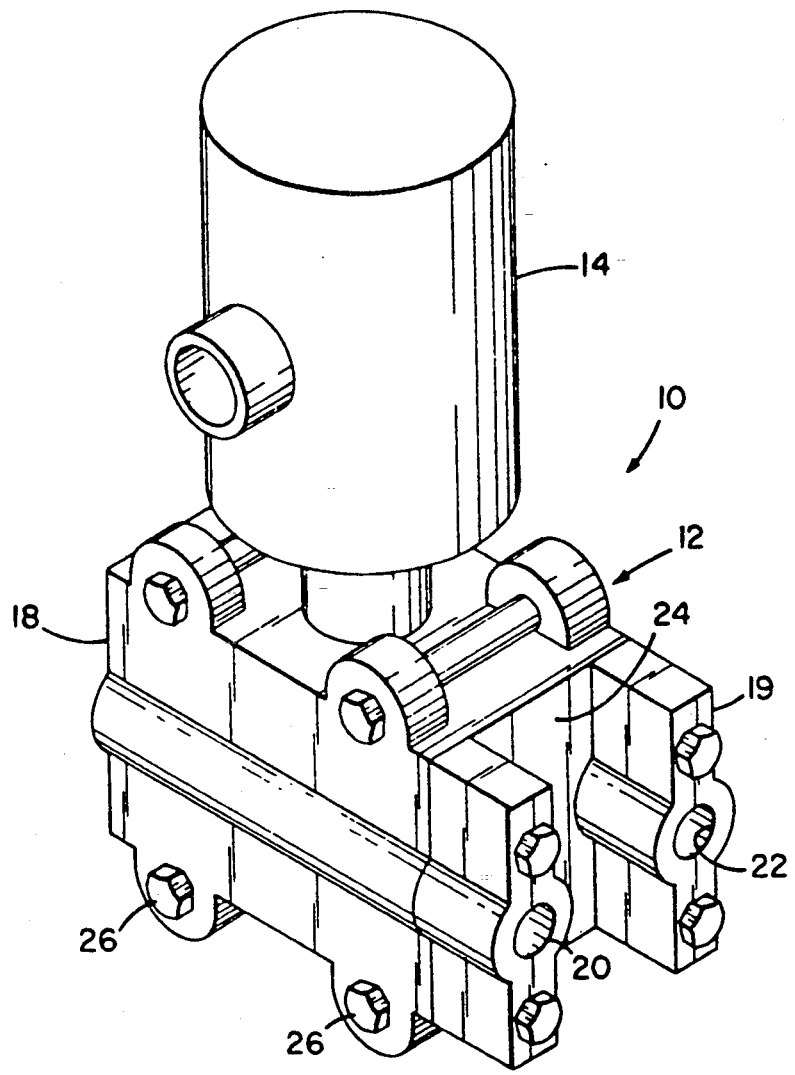
FIG. 1 is a perspective view of a differential pressure transducer structure in accordance with the invention.

A device in accordance with the invention is described in terms of a transducer 10 seen in complete form only in FIG. 1 and based upon a capacitive measurement technique. The transducer 10 has a metal, typically stainless steel, body 12 housing the sensor unit, and a separate electronics housing 14 for enclosure of circuits in the demanding industrial environment in which these transducers are typically used. The transducer body comprises a pair of spaced apart end plates 18, 19 of mirror image configuration that include end ports 20, 22 respectively for receiving pressurized fluids whose pressure differential is to be measured. The plates 18, 19 are joined to opposite sides of a central fluid housing body 24 by bolts 26 which secure the body together in two orthogonal directions with sufficient force to maintain integrity under the high pressures to be encountered.

Figure 2:
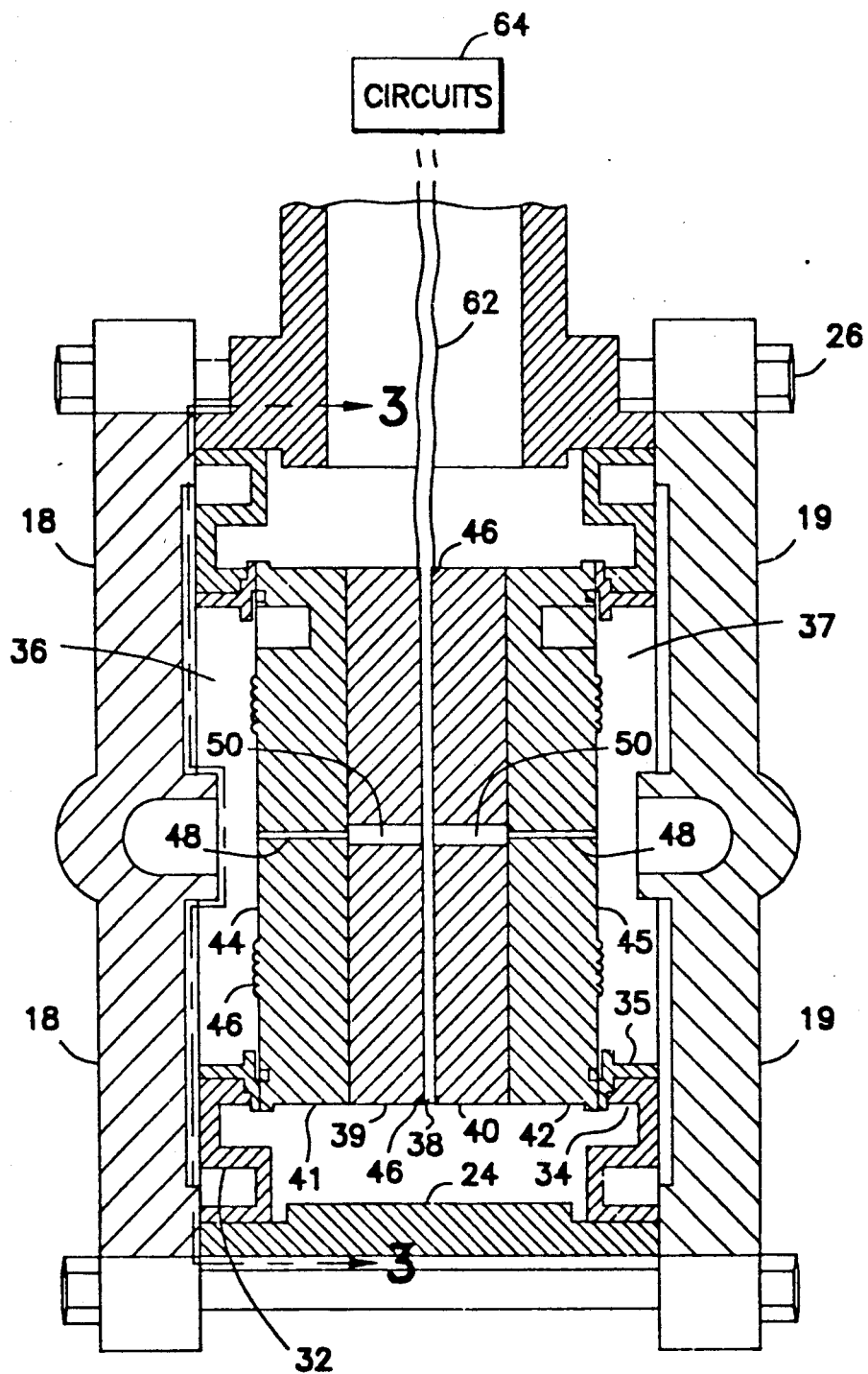
FIG. 2 is an end sectional view of a portion of the transducer of FIG. 1 showing a pressure transducer cell and a compliant support structure.
Figure 3:
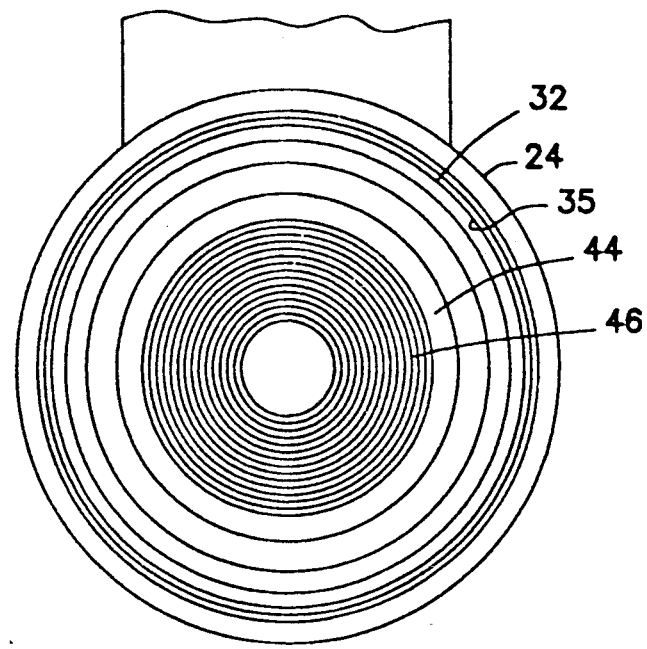
FIG. 3 is a side sectional view of a portion of the device of FIG. 2, taken along the line 3—3 looking in the direction of the appended arrows.
Figure 4:
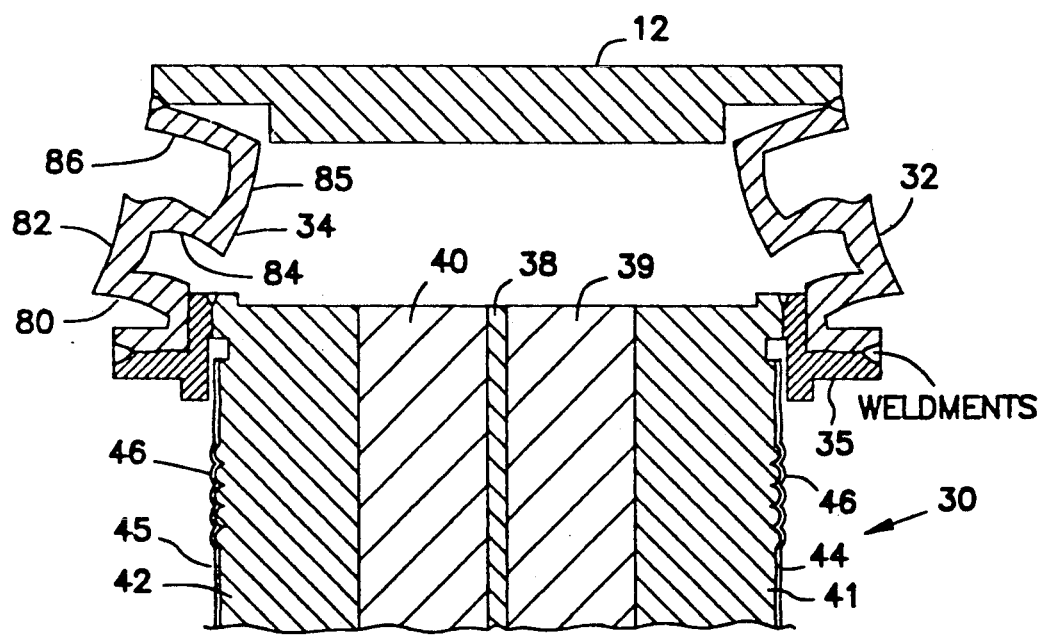
FIG. 4 is a fragmentary end sectional view of a portion of the device of FIG. 2, showing distortion of the compliant structure in exaggerated form.

A principally ceramic transducer cell 30, best seen in FIGS. 2-4, is mounted in a fashion affording limited compliance within the transmitter body 12. The transducer cell 30 comprises a solid cylindrical laminate, concentric about a central axis, and spaced apart from the walls of the encompassing body 12. However, mounting is provided by coupling the periphery on each flat side of the transducer cell to different first and second compliance rings 32, 34 of S-shaped cross section. The compliance rings are actually attached to the respective peripheries of the transducer cell 30 by engagement to weld rings 35, which themselves are affixed to the transducer cell 30 by peripheral weldments. The weld rings 35 are of what may be termed to be generally L-shaped in cross section, while the compliance rings are of S-shaped cross section, and particularly configured with wall thicknesses and lengths for reasons set out in more detail hereafter.

Figure 5:
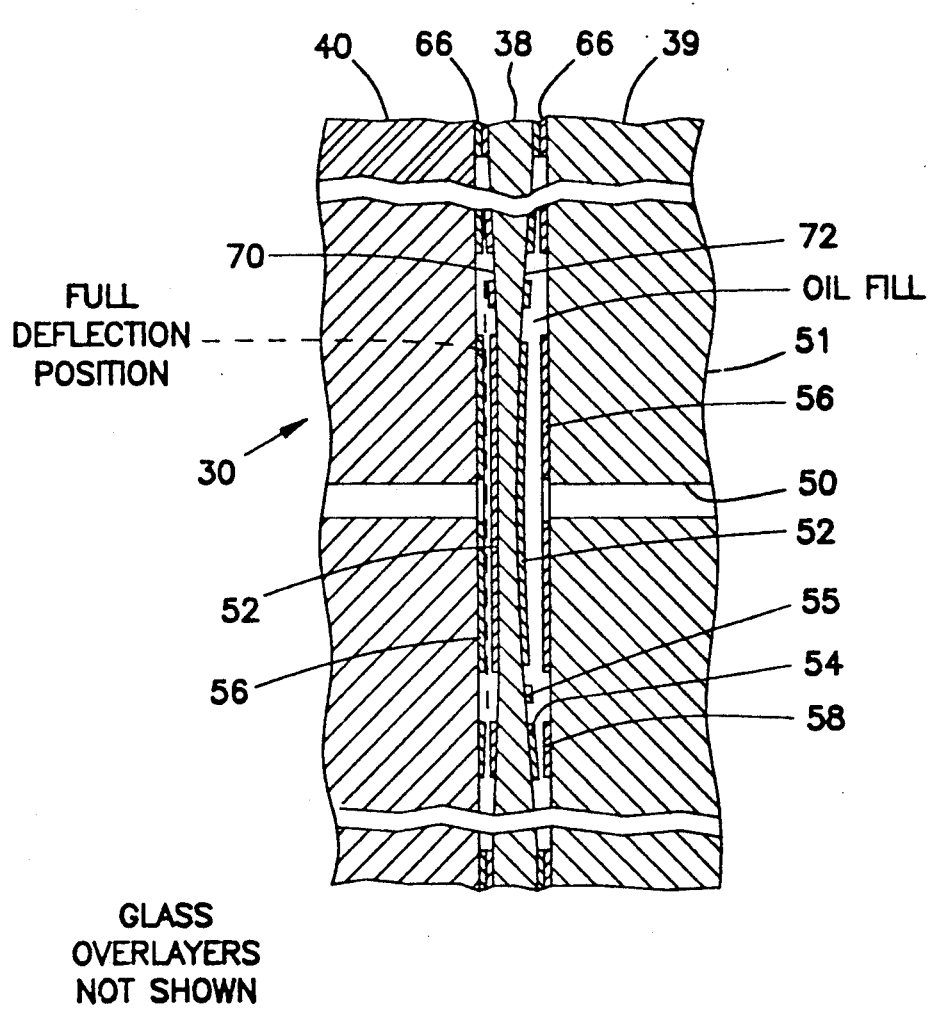
FIG. 5 is an enlarged end sectional view of a portion of a partially deflected ceramic diaphragm having 4th order concave curved surfaces thereon, illustrating a fully deflected position in dotted lines.
Figure 6:
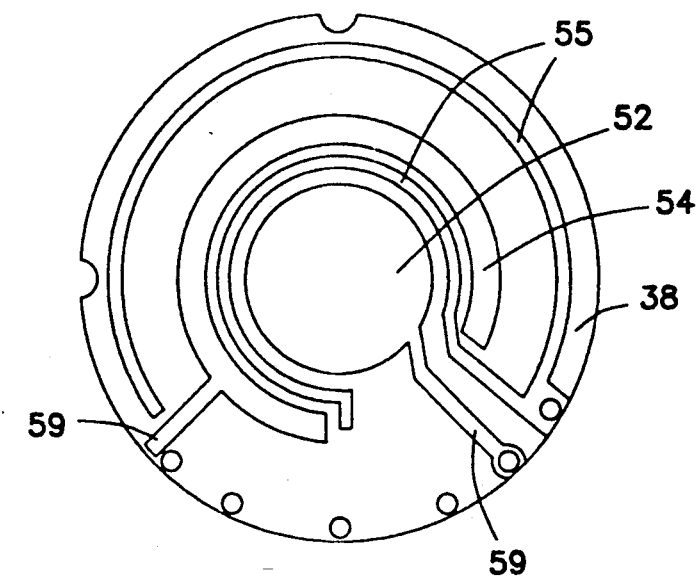
FIG. 6 is a plan view of one surface of the diaphragm, showing electrode patterns thereon.
Figure 7:
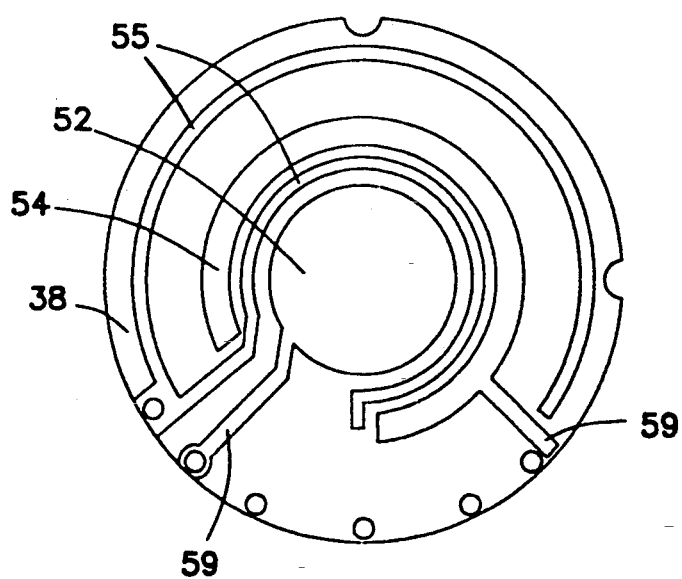
FIG. 7 is a plan view of the second surface of the diaphragm, showing the electrode patterns thereon.
Figure 8:
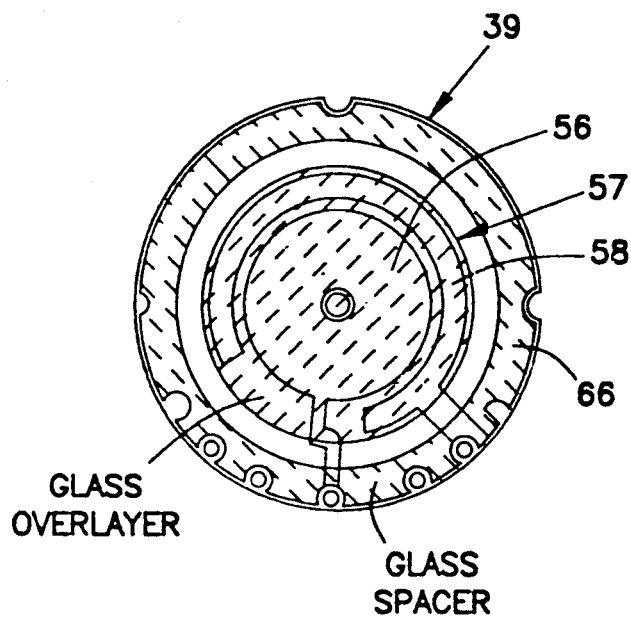
FIG. 8 is a plan view of the electrode bearing surface on one reference plate.
Figure 9:
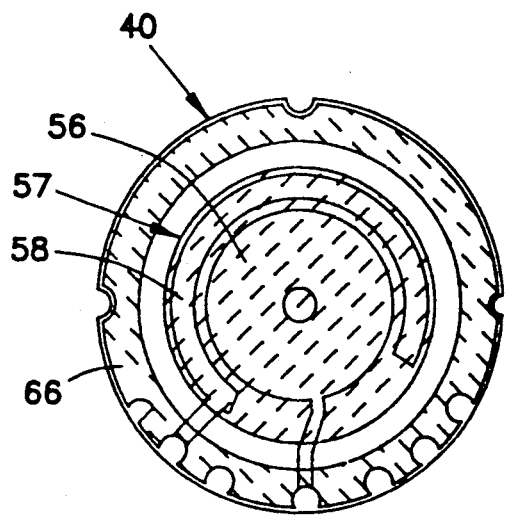
FIG. 9 is a plan view of the electrode bearing surface on the other reference plate.

Between the end plates 18, 19 and the opposite sides of the transducer cell 30, the ports 20, 22 respectively feed in first and second pressure varying fluids 36, 37 respectively. These pressures are to be transmitted to the opposite sides of a central ceramic diaphragm 38, having compound curvatures forming concavities in the opposite faces, as best seen in FIG. 5 in exaggerated form (although not evident in FIGS. 2 to 4 because these figures are closer to scale). The ceramic diaphragm 38 is symmetrically disposed between a pair of adjacent reference plates 39, 40 of ceramic materials. Opposed film electrodes described in more detail hereafter are disposed on the faces of the diaphragm 38 and the reference plates 39, 40 to provide the basis for capacitive measurement of displacement variations in the diaphragm under differential pressure changes.

The opposite sides of the reference plates 39, 40 from the ceramic diaphragm are engaged by and glass bonded to first and second metal corrosion rings 41, 42 respectively which provide the needed transition to the metallic adjacent structure, and which also provide mechanical support. Pressure is transmitted into the region of the diaphragm from each side via first and second isolation diaphragms 44, 45 respectively which span across the outer faces of the corrosion rings 41, 42. There is a space (not evident except in exaggerated form in FIG. 4) of the order of 1 mil between an isolation diaphragm and its adjacent ring. The diaphragms 44, 45 include corrugations 46 matching similar surfaces on the rings 41, 42. Each ring 41, 42 has a central conduit 48 symmetrical with the central axis and leads to a central bore 50 in the adjacent reference plate 39 or 40. The volume confined between each isolation diaphragm, such as 44, and the adjacent side of the ceramic sensing diaphragm 38, is filled with an oil fill 51, shown only in FIG. 5. Thus pressures acting on the isolation diaphragm 44 or 45 are transferred through the conduit 48 and bore 50 to the adjacent side of the sensing ceramic diaphragm 38, both sides acting alike in this respect.

Referring now briefly to FIGS. 6 to 9, the electrode patterns on the two sides of the diaphragm 38 and the facing reference plates 39 and 40 are substantially alike, so that only one of each need be described. The sensor electrode 52 on the diaphragm is concentric with the central axis and in the form of a disk. At a radial spacing from the central sensor electrode 52, also concentric with the central axis is a reference ring electrode 54. Guard electrodes 55 coupled to ground are disposed between the reference ring electrode 54 and sensor electrode 52. The pattern on the opposed reference plate 39 or 40 (FIGS. 8 and 9) is substantially a mirror image (except that no guard band is used), comprising a central sensor disk electrode 56 and an encompassing and spaced apart reference ring electrode 58. The reference plates 39, 40 also include peripheral glass spacer rings 55 and central glass layers 57 covering the electrodes 56 and 58. The patterns on the diaphragm 38 and the opposed reference plates 39, 40 are typically prepared by thin film techniques, such as screening a metal-organic material to deposit a precise pattern of controlled thickness such that when fired produces a thin film. The separate electrode patterns terminate at conductive lead lines 59 which reach the outer periphery of the transducer cell, from which connections are made by a flat multiconductor cable 62 to the electronic circuits 64, which are contained within the electronics housing 14. Under most conditions of operation one or the other sensing electrode pair 52, 56 can be used to derive a suitably precise output. The reference electrode pairs 54, 58 can be in a non-deflecting region, but preferably the two reference electrodes 54 on the diaphragm 38 are coupled together and thus form a constant reference despite deflection of the diaphragm 38.

Figure 10:
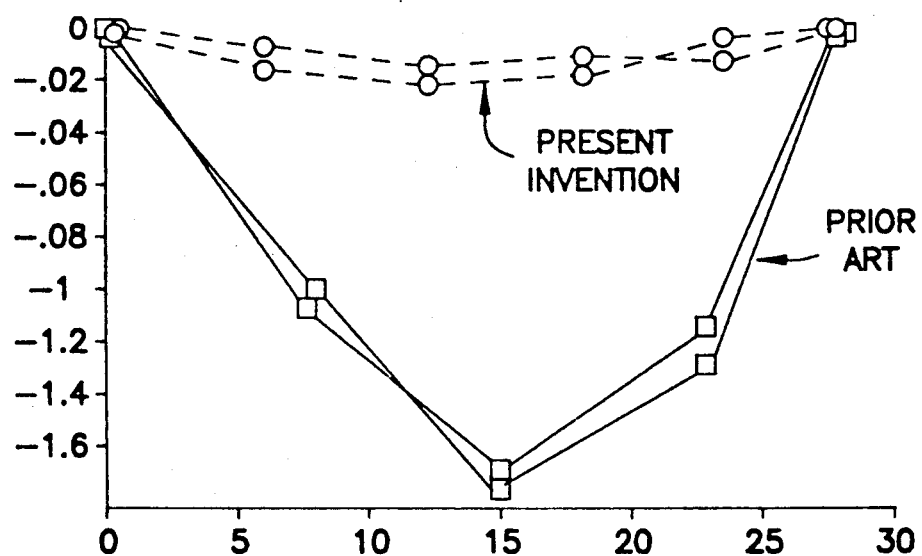
FIG. 10 is a graph of non-linearity characteristics at different pressures for a diaphragm in accordance with the invention in contrast to a prior art diaphragm.

The spacing and coupling of the diaphragm 38 to the facing reference plates is provided by the thin peripheral seal 55, such as a glass bond, up to about 10 microns height in this example. Thus the spacing between the diaphragm 38 and the opposed reference plates 39, 40 is essentially determined by the fourth order deflection curve cavity in the diaphragm, which is of 5 to 50 microns in depth. Details of the "fourth order deflection curves" on the opposite sides of the diaphragm 38 may be seen in exaggerated form in FIG. 5. The diaphragm 38 is shown as displaced from a central position toward one side of the central plane, but not at the limit position, which is shown by a dotted line. At the limit position, the less concave surface of the deflected diaphragm 38, here designated by numeral 70, is substantially planar while the opposite side, here designated 72, is at maximum concave curvature. Inspection of this curvature reveals the fourth order characteristic, in that the region of maximum slope is in a sector intermediate the undeflected peripheral edge and the central axis. Because the diaphragm 38 is secured at its outer periphery there is no appreciable deflection in this sector. At the central axis, the tangent to the curve of the concavity remains parallel to the central plane, so that the tangent to the curve of maximum slope is somewhere between, and outside the region of the sensor electrodes. In consequence, referring now to the graphs of FIG. 10, there is much greater nonlinearity in a prior art differential capacitive sensor structure, in which the sensor electrode has substantial convex curvature as it approaches its limit position. A differential pressure transducer in accordance with the invention has a terminal nonlinearity of less than 0.3% over a 30 psi pressure range, in contrast to the greater than 1.7% nonlinearity over the same pressure range found with the prior art structure. (A preferred example of one manner in which a contoured diaphragm may be prepared in accordance with the invention is provided below.)

Significant operating advantages are also obtained by virtue of the mounting construction using compliant rings 32, 34 that supports the transducer cell 30 within the housing 12. Relative to the central axis of the cell 30, there is substantially higher stiffness in the direction parallel to the central axis, than in the direction radial to the central axis, in the plane of symmetry of the central diaphragm 38. The stiffness ratio between these two directions is controlled by the thickness of the radial segments 82, 85 relative to the axial segments 80, 84, 86. The S-shaped curvature enables these beams to be stressed individually. Thus, as shown in exaggerated form in FIG. 4, substantial thermal distortion of the metal housing 12 relative to the principally ceramic transducer cell 30, distorts the rings 32, 34. Axial displacement is allowed, but there is minimal distortion in the radial direction. Consequently, a linkage is introduced between the housing 14 and the transducer cell 30 that is asymmetrical in character. Because the housing 14 must be corrosion resistant it is manufactured of a high thermal coefficient of expansion material, such as 300 Series SST, 17-4 PH stainless steel, Hastelloy-C or other materials. Under changing (e.g. increasing) temperature conditions, the higher expansion of the housing 12, if directly coupled to the transducer cell 30, would introduce significant radial stresses and displacements which could cause errors in signal outputs with temperature. The present arrangement substantially decouples the transducer cell from these thermal displacements and errors. However, at the same time, the resistance to loads in the axial direction means that the transducer cell is not subject to unwanted deviations because of fluid pressure imparted loads. This arrangement permits the designer of a transducer housing has greater freedom in joining the other metal parts of the housing to the transducer cell.

Figure 11:
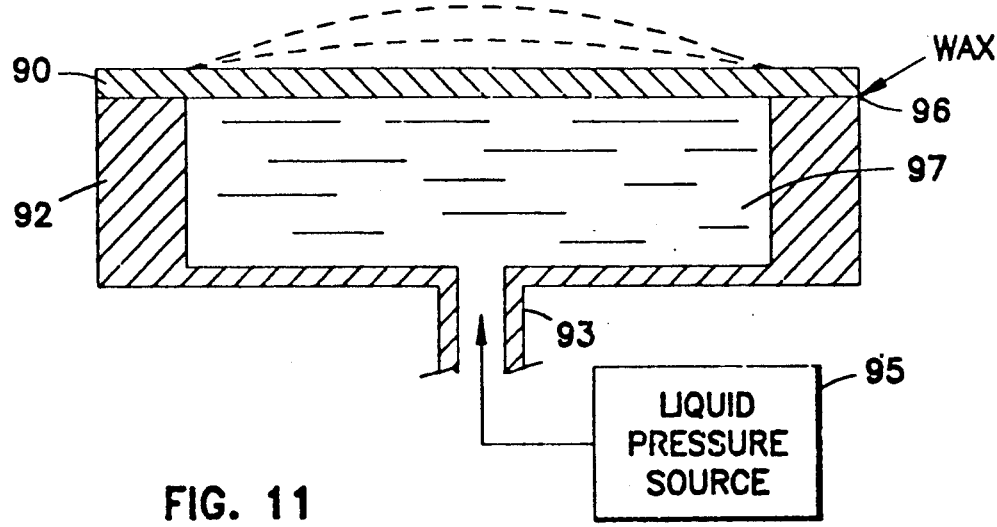
FIG. 11 is a perspective view of a pre-machined diaphragm in relation to a fixture for introducing a 4th order deflection curve in a surface thereof.
Figure 12:
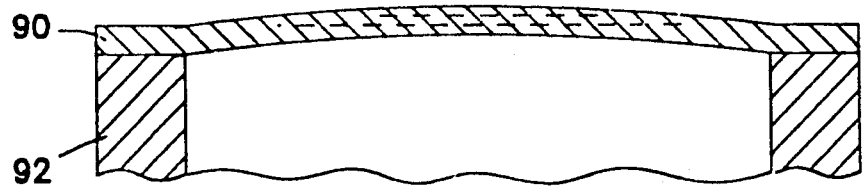
FIG. 12 is a somewhat idealized view of a diaphragm held in the fixture of FIG. 11 and with deflected surface removed during successive stages of surface grinding.
Figure 13:
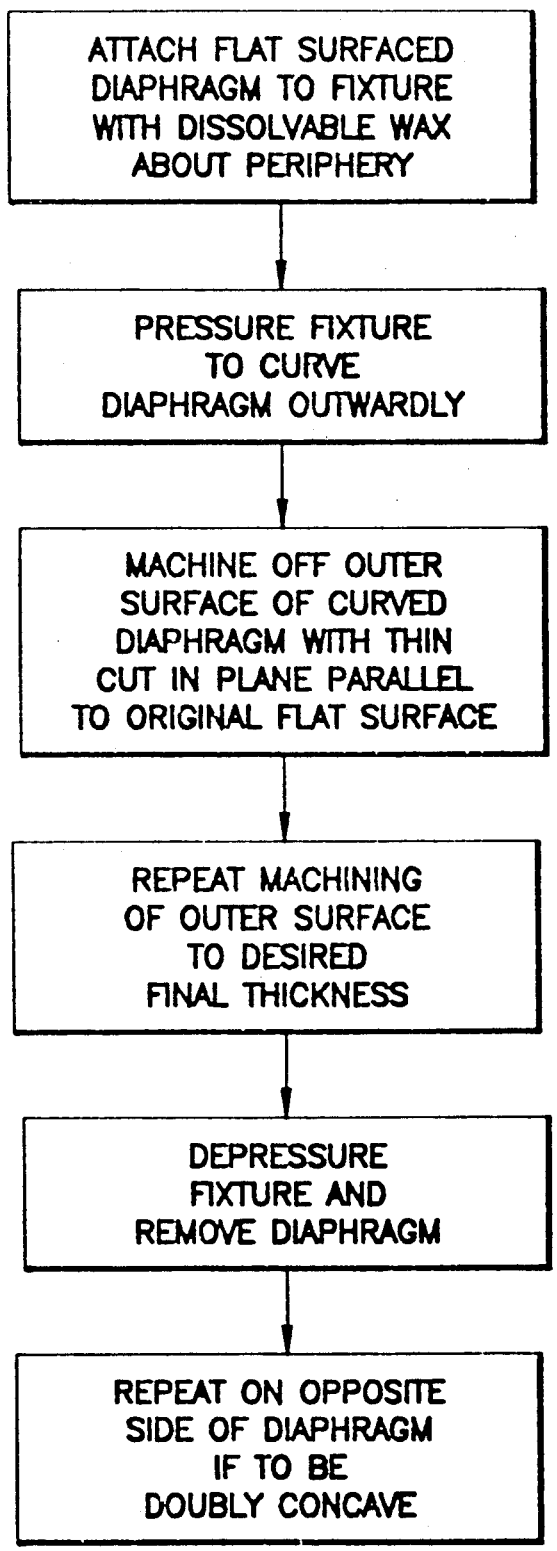
FIG. 13 is a flow diagram identifying the various stages in forming the 4th order deflection curve.

FIGS. 11-13 depict the structure and method by which fourth order deflection curves may be formed into one or both sides of a flat diaphragm 90. As seen in FIG. 11, the diaphragm is mounted on a cup-shaped fixture 92 having an input port 93, coupled to a liquid pressure source 95. The peripheral surface of the cup-shaped fixture lies in a precise plane to which the periphery of the diaphragm may be attached by a high strength wax 96. When so attached, the interior of the fixture 92 is filled through the port 93 by a fluid 97 and the internal pressure is raised to a range equal to or greater than that desired for nominal operation range of the transducer system into which the diaphragm 90 is to be disposed. Under the influence of this internal pressure, the diaphragm 90 deflects outwardly, but significantly the curve is not parabolic because of the restraint at the outer edges. As seen in FIG. 12, after attachment of the diaphragm to the fixture and pressurizing internally, the removal of material can commence, once the diaphragm is precisely aligned with the plane of a lapping or grinding machine. In FIG. 12, the dotted lines represent not individual cuts but the accumulation of a number of passes. Each pass removes the uppermost portion of the deflected diaphragm 90, at about 1 micron per pass in this example, to provide a flattened surface. As the final cut is approached, the compound curvature that is introduced into the surface of the diaphragm 90 (after relaxation) is almost precisely the fourth order deflection curve, with little curvature at the outer periphery, a horizontal tangent at the center, and maximum slope of a tangent to the curve in intermediate areas. Consequently, the fixture 92 can be depressurized and the wax 96 dissolved to free the diaphragm 90. For a double-sided diaphragm 90, the procedure can be repeated with the diaphragm 90 inverted.

For low pressure devices, it is preferred to pressurize the fixture with an incompressible liquid such as water or oil so that there is maximum reactive force against the lapping machine. Where the diaphragm is to be operated at higher pressures, pressurization can be achieved using a compressible gas, such as air or nitrogen, as well as an incompressible fluid.

Figure 14:
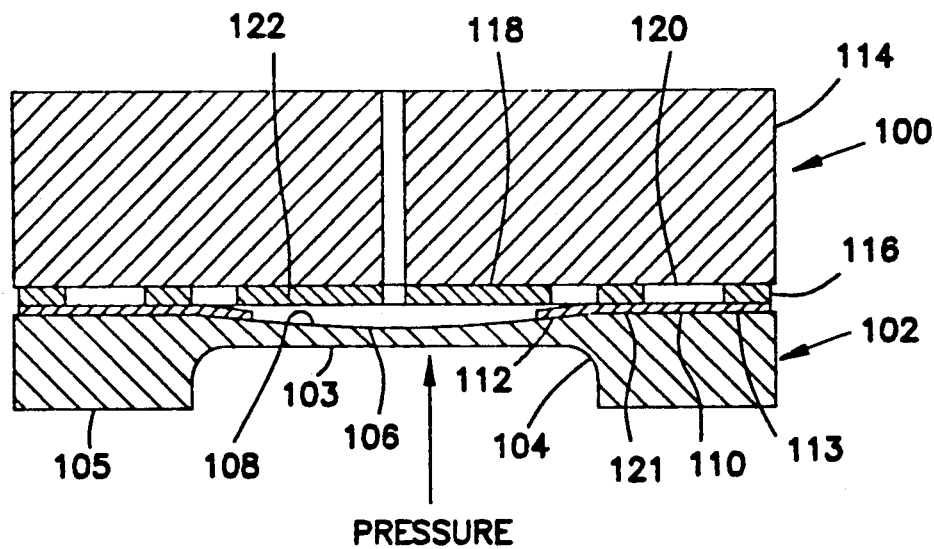
FIG. 14 is a side view of a single sided transducer having a concave surface.

FIG. 14 illustrates an example of a pressure transducer 100 of the gauge or absolute pressure type, shown with the single-sided diaphragm 102 in unpressurized or relaxed position, and with exaggerated thicknesses for the spacer and electrode elements. Pressure is applied to the underside of the diaphragm 102 at a concavity 104, which defines a relatively thin central web 103 and a thick outer flange 105 for the diaphragm 102. The thick flange 105 is substantially rigid under the pressures used, and thus restrains the web 103 about its periphery. A sensor electrode 106 is disposed on the 4th order deflection concavity 108 on the electrode-bearing side of the diaphragm 102. A reference electrode ring 110 is disposed in the non-deflecting region of the flange on the surface of the diaphragm 102. Guard band electrodes 112, 113 are disposed on each radial side of the reference electrode 110 on the diaphragm 102. The reference element 114 opposed to the electrode-bearing side of the diaphragm 102 is spaced apart by a thin peripheral seal 116 and bears a central sensor electrode 118 and outer reference ring electrode 120. Glass layers 122 of controlled thickness are disposed on the surface of the reference plate 114, over the sensor electrode 118 and adjacent the reference electrode 120, to provide a basic gap thickness of approximately 5 to 20 microns. The reference electrode 110 and guard electrodes 112, 113 on the diaphragm 102 are covered with a thin glass layer 121 as well.

With this somewhat idealized arrangement shown in FIG. 14 it can clearly be seen that as the controlled curvature web 103 in the mid-region of the diaphragm 102 moves under the influence of pressure, toward the reference plate 114, it approaches a planar configuration. The closer the surface of the web 103 is when it is displaced toward the sensor electrode 118, the more parallelism there is, until the glass layer 122 is encountered. The presence of the glass layer 122 provides a backup against overloads on the diaphragm 102.

Figure 15:
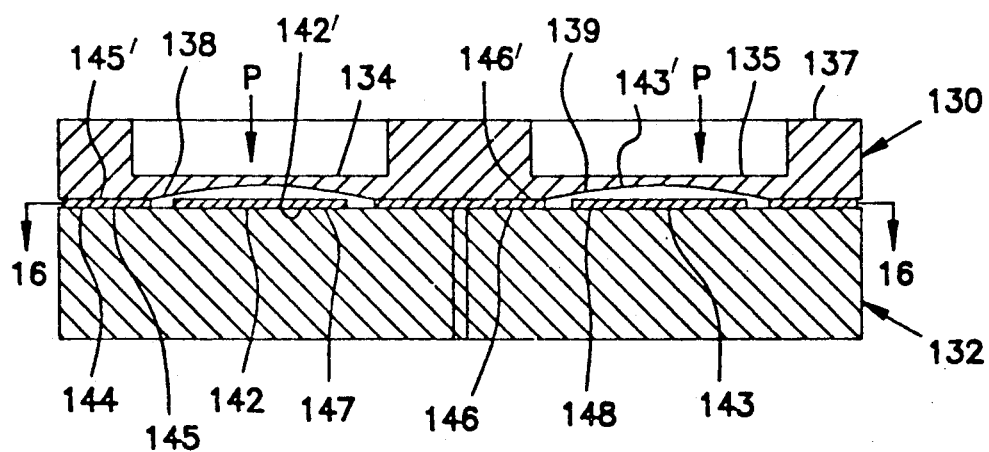
FIG. 15 is a side view of a differential transducer using side by side diaphragms.
Figure 16:
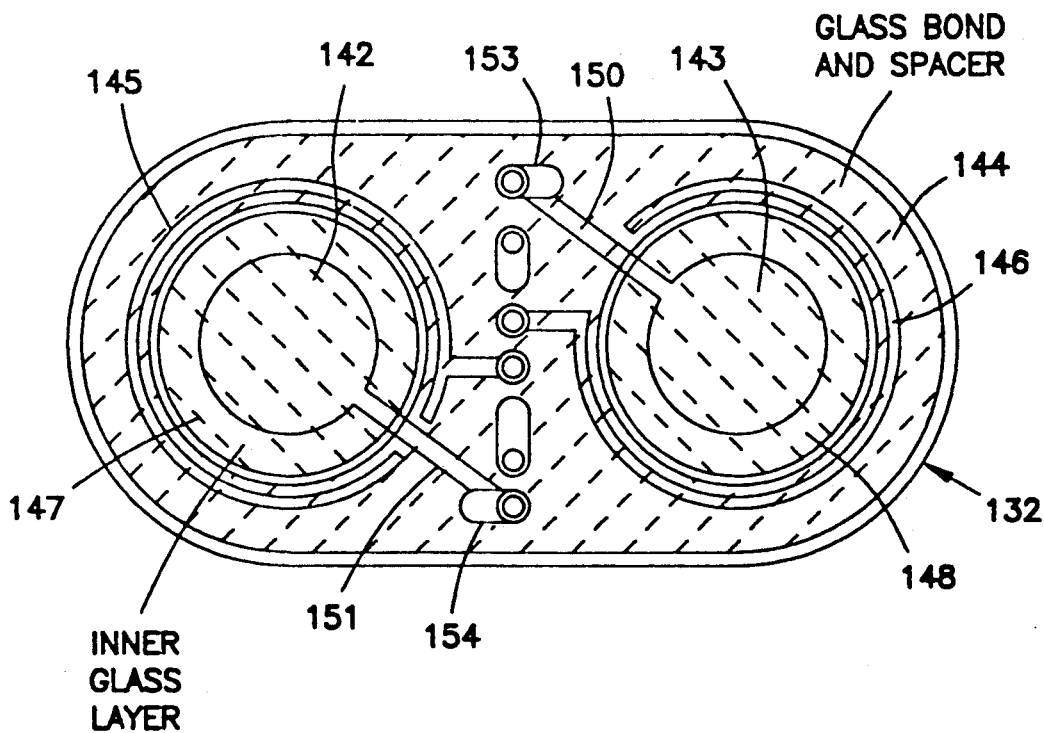
FIG. 16 is a plan view of the transducer of FIG. 15.

The same principle is utilized in a differential pressure transducer using side-by-side capacitance elements as shown in the sectional views of FIGS. 15 and 16. Again, only the diaphragm structure 130 and facing reference plate 132 are shown for simplicity. The diaphragm 130 includes a pair of concavities defining thin central webs 134, 135 against which pressure variations (P) from separate sources are applied. Peripheral flanges 137 that are not significantly deflected by pressure surround the central webs 134, 135, which have 4th order curvatures 138, 139 on their surfaces. Sensor electrode pairs 142, 142' and 143, 143' are disposed in the mid-regions of the webs 134, 135 and facing surfaces of the reference plate 132. The sensor electrode pairs are thus concentric with the central axes of the two different transducers that are defined by this arrangement. A peripheral seal and bonding spacer comprises a glass bonding layer 144 that encompasses the periphery and central region between the separate transducers including reference electrode rings 145, 146. Inner glass layers 147, 148 cover the central regions of each transducer, including the separate sensor electrodes 142, 143 on the reference plate 132. Reference electrode rings 145', 146' are disposed on the reference plate 132 facing the reference electrodes 145, 146 respectively on the diaphragm structure 130. As seen in FIG. 16, thin film leads 150, 151 from the sensor electrodes 142, 143 respectively extend to a bore 153 or 154 respectively, by which output connections may be made. Similar leads are coupled from the reference electrodes to the external circuits.

There are a number of fabrication and operational advantages to this arrangement at relatively very little expense in operational characteristics. In a number of instances it is not convenient to have pressures applied to opposite sides of a transducer, for geometrical, spatial or other reasons. Consequently, this type of transducer can serve in such installations. There are advantages to use of common diaphragm and reference plate bodies. Although it is to be expected that some minor differences in thickness of the deflecting web in each transducer cell might result, these small differences are substantially compensated by the deflection curve grinding procedure.

Figure 17:
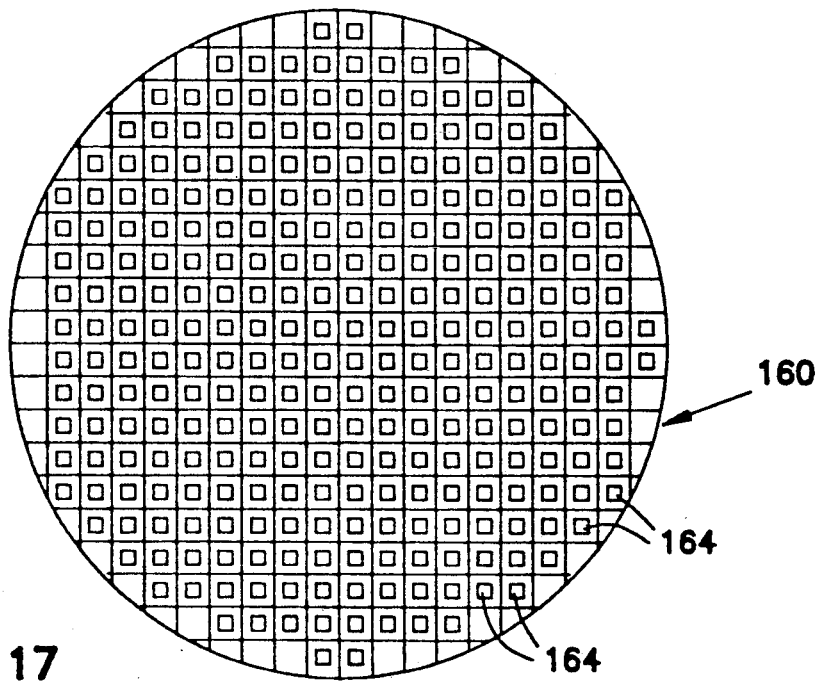
FIG. 17 is a view of a multi-diaphragm structure defining a pair of single sided diaphragms having 4th order deflection curve surfaces.
Figure 18:
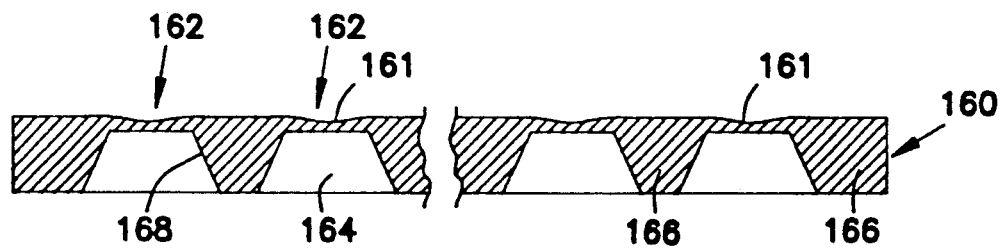
FIG. 18 is a side sectional view of a fragment of the structure of FIG. 17.

FIGS. 17 and 18 illustrate a multi-element wafer 160 useful for the multiple processing of a batch of contoured diaphragms 162 in accordance with this invention. The wafer 160 can be fabricated from a semiconductor material such as silicon or from an elastic insulator such as fused silica or alumina.

The wafer 160 may contain hundreds or more identical diaphragm structures 162 that have been formed using well known etching techniques such as isotropic etching or anisotropic etching, or by molding, machining or some combination of these techniques. The fabrication method forms individual cavities 164 separated by flanges 166 as best seen in the side sectional view of FIG. 18.

The wafer 160 is then mounted, by a mechanical means or a mounting wax, to a fixture corresponding to that of FIG. 11. However, the fixture (not shown) may have a pattern of holes that connect to the cavities 164 when the wafer is mounted to the fixture with the base of the flanges 166 being removably secured. By pressurizing as disclosed above relative to FIGS. 11-13, each diaphragm element 162 is contoured by removal of surface layers so as to produce the desired fourth order deflection curve surface 161. Whether formed by etching or molding, the flanges 166 defining the concavities 164 preferably have slanted sides 168.

Figure 20:
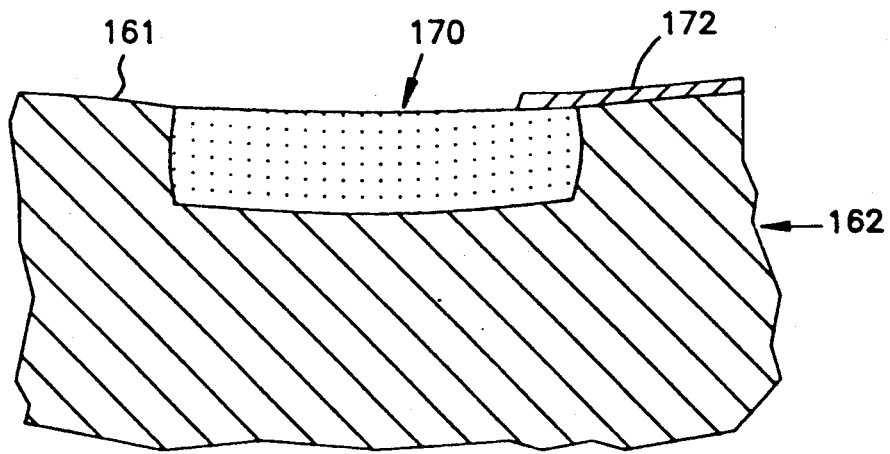
FIG. 20 is an enlarged fragmentary sectional view of a diaphragm incorporating a diffused piezoresistive transducer element.
Figure 21A:
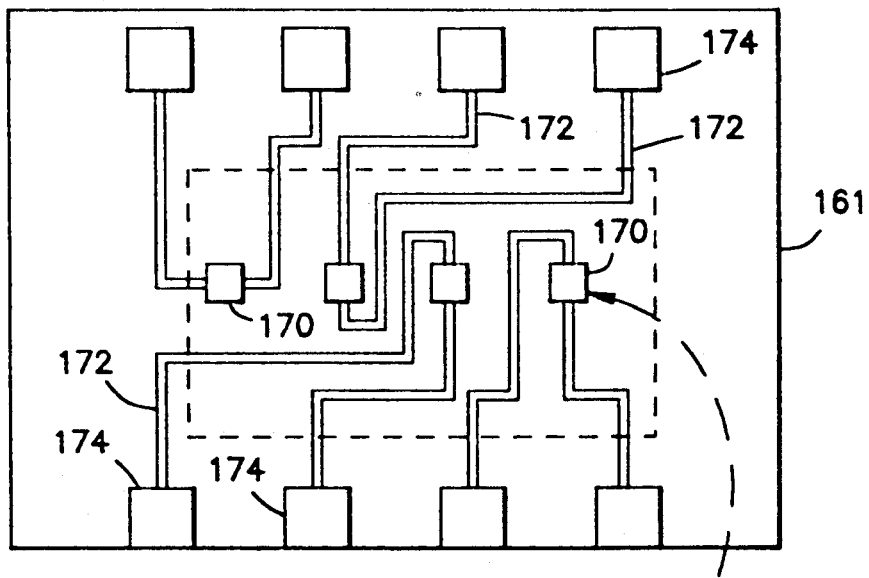
FIGS. 21A and 21B are plan views of a transducer diaphragm and piezoresistive transducer elements.
Figure 21B:
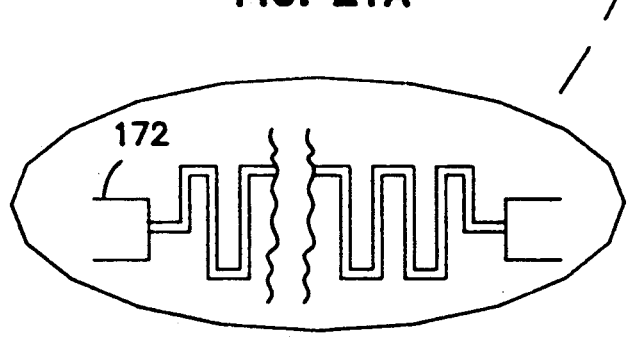

In order to utilize a machined semiconductor wafer 160 to form multiple piezoresistive sensors, the wafer 160 is further processed to introduce a number of piezoresistive transducers into the contoured surfaces of the diaphragm elements 162. Techniques such as ion implantation or diffusion can be used to impart piezoresistive materials into the contoured webs of the elements 162. As seen in FIGS. 20 and 21, the elements 170 thus formed are connected through metallized or diffused conductors 172 to the area at the edge of the flange 166 where metallized pads 174 provide lead attachments to connect to external electrodes (not shown). Using four elements 170 on a contoured surface enabels the elements to be used in a Wheatstone bridge configuration for measurement of deflection.

Figure 19:
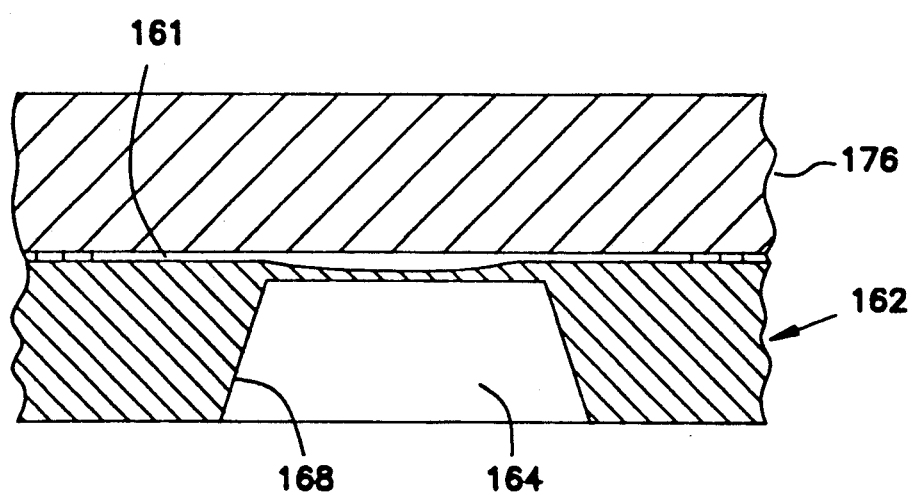
FIG. 19 is an enlarged side sectional view of one element of a transducer based on the structure of FIGS. 17 and 18 and using a piezoresistive sensor.

In the side view (FIG. 19) a second reference wafer 176, essentially a flat semiconductor or "pyrex" glass plate, is seen to be joined to the machined wafer surface 161 at the periphery with a close spacing, using a technique such as anodic bonding or silicon diffusion bonding. The resulting structure includes a cavity formed between the reference wafer 176 and the contoured surface 161. Pressure is applied to the concavity 164 on the side opposite the reference wafer 176. The reference wafer 176 may contain holes (not shown) that serve to provide an atmospheric reference pressure in the final device. It may also contain etched slots or spaces that will provide the openings for attachment of leads.

The combined structure 160 of FIG. 17, with individual webs 162 having contoured surfaces, embedded piezoresistive elements 170 in the surfaces, and superimposed reference wafer 176, defines many separate transducers. It may then be sawed into the individual transducers of FIGS. 19 and 21.

Alternatively, the batch processing approach may be used to form contoured diaphragms in capacitive sensors. For this purpose the machined wafer, having fourth order curvatures in the diaphragm webs, is processed to receive the thin film electrodes as previously described, or by diffused or metallized conductors to connect to bonding pads. The flat reference wafer is also processed to add one or more electrodes that are connected by diffused or metallized conductors to bonding pads in a mirror image configuration. When the diaphragm wafer is bonded to the reference wafer (as by silicon diffusion, anodic bonding or other well known techniques), the diaphragm electrodes overlay the reference wafer electrodes, creating capacitances which can be measured to determine the pressure.

The combined wafers are then sawed in the same manner as the piezoresistive type, above, in order to separate the individual sensing elements.

While there have been described above and illustrated in the drawings various forms and modifications in accordance with the invention, it will be appreciated that the invention is not limited thereto but encompasses all alternatives within the scope of the appended claims.

What is claimed is:

1. A force sensor comprising:
    at least one reference element having a substantially planar surface;
    a deflectable diaphragm having a central deflection area disposed adjacent and facing the reference element, the surface of the diaphragm in the central deflection area facing the reference element having a fourth order curvature in a concave sense;
    peripheral means comprising a flange integral to the diaphragm about the central deflection area and bonding means about the central deflection area coupling the flange to the reference element such that the peripheral means is substantially non-deflecting in response to the forces applied, to confine the deflection of the diaphragm to the central deflection area;
    means associated with the diaphragm for sensing the deflection thereof in response to an applied force; and
    means for applying the force to be sensed to the central deflection area of the diaphragm on the side opposite the reference element.

2. A sensor as set forth in claim 1 above, wherein the means for sensing comprises piezoresistive means coupled to the central deflation area of the diaphragm.

3. A sensor as set forth in claim 1 above, wherein the means for sensing comprises a pair of facing electrodes on the planar surface of the reference element and the central deflection area of the diaphragm respectively.

4. A sensor as set forth in claim 1 above, wherein the sensor is a differential sensor and comprises first and second reference elements having planar surfaces disposed on opposite sides of the diaphragm, and being substantially non-deflecting under the forces applied, the peripheral means comprising the two reference elements and means bonding the two reference elements to the diaphragm about the central deflection area, the means for sensing being associated with at least one concave surface of the diaphragm.

5. A sensor as set forth in claim 4 above, wherein the means for sensing are associated with both sides of the diaphragm, and include reference means disposed on the reference element and diaphragm, and wherein the sensor includes means for applying loads to both sides of the diaphragm.

6. A sensor as set forth in claim 1 above, wherein the sensor comprises a pair of side by side diaphragms in a single structure adjacent and facing a spaced apart planar surface of a reference element, the peripheral means comprising an integral flange about the central deflection area of each diaphragm means for applying separate loads to each of the different diaphragms, and means associated with each of the different diaphragms for sensing the deflection thereof, and wherein the means for applying force comprises means for applying different forces to the diaphragms and the means for sensing comprises means for sensing the different in the forces.

7. A differential pressure sensor comprising the combination of:
    a pair of spaced apart reference elements having planar facing surfaces in opposition and being substantially non-deflecting under the pressures applied, and each reference element including means for communicating a fluid under pressure into the region of the facing surface thereon;
    diaphragm means disposed between the reference elements about a central deflection region, the diaphragm having concave surfaces on each side, the curvatures of the concave surfaces of the diaphragm varying in accordance with the deflection curve for an edge bound diaphragm to have a central region curving in one sense and edge regions curving in the opposite sense and separated when not deflected by a gap determined primarily by the concavity from the facing surface of the adjacent reference element;
    reference elements about the periphery of the central deflection region, such that the periphery of the diaphragm means is not deflecting and the concave surface on the side toward which the diaphragm moves tends to become planar; and sensing means to determine the deflection of the diaphragm means in response to the pressures exerted by the fluids.

8. A sensor as set forth in claim 7 above, wherein the sensing means comprises electrode means on at least one reference element and on at least one concave surface of the diaphragm means to form one or more variable capacitors.

9. A sensor as set forth in claim 8 above, further including at least one set of reference electrodes on facing surfaces of the reference elements and another set of reference electrodes on both sides of the diaphragm interposed spatially between the reference electrodes on the reference elements, the reference elements being coupled to form an invariant reference capacitor for use in signal processing the output of the sensor.

10. A sensor as set forth in claim 9 above, wherein the diaphragm when deflected toward a reference member tends to become substantially planar at a limit position and wherein the adjacent reference element acts as a planar backup surface for engagement against the substantially planar surface of the deflected diaphragm in the event of excess deflection pressure.

11. A sensor as set forth in claim 10 above, wherein the reference element and diaphragm are concentric about a central axis and the peripheral means is concentric about the central axis at a given radius and comprises glass bonding layers.

12. A sensor as set forth in claim 11 above, wherein the reference elements each include aperture means leading to the gap between the reference element and the associated side of the diaphragm, and wherein the reference elements and concave surfaces of the diaphragm each include opposed thin electrode means on the surfaces thereof.

13. A sensor as set forth in claim 12 above, wherein the curve on the surface of the diaphragms are configured to provide capacitive output inversely proportional to the deflection of the diaphragm.

14. A sensor as set forth in claim 7 above, wherein the sensing means comprises piezoresistive means disposed at least on one concave surface of the diaphragm means in the central deflection region.

15. A sensor as set forth in claim 14 above, wherein the piezoresistive means are disposed on both concave surfaces of the diaphragm means in the central deflection region.

16. A sensor as set forth in claim 7 above, including in addition housing means encompassing the reference elements and diaphragm and deformable support means holding the structure of the reference elements and diaphragm within the housing with said support means providing substantially greater axial than radial stiffness symmetrically about the structure.

17. A sensor as set forth in claim 16 above, wherein said support means comprises a pair of rings having axial and transverse cross-sectional areas, and wherein the housing means has spaced apart mounting surfaces adjacent the opposite ends of the sensor, and the rings each separately engage a different mounting surface and the adjacent end of the sensor.

18. A differential pressure sensor comprising:
a differential pressure sensing cell of principally ceramic material having faces on opposing parallel sides thereof exposed to different fluids whose differential pressure is to be sensed the cell having a periphery that is symmetrical about a central axis normal to the opposing forces and the fluid forces acting axially;
a metal housing encompassing the pressure cell and including mounting surfaces thereon spaced apart from the periphery of the cell and disposed thereabove; and
a pair of mechanical support ring coupling means, each coupling a different one of the opposing faces at the periphery of the cell to the housing, each of the mechanical coupling means forming a three dimensional body symmetrically disposed about the adjacent face of the cell and having greater stiffness in the direction in which fluid pressure forces act against the cell than in the direction normal thereto.

19. The invention as set forth in claim 18 above, wherein the support rings have generally S-shaped cross sections with axial and radial beams, the axial beam length and thickness relative to the radial length and thickness providing the desired stiffness relationship.

20. A pressure transducer comprising:
a reference member having a planar surface, the reference member being substantially non-bending under the pressures being sensed;
a pressure sensing diaphragm having a flanged periphery disposed closely adjacent and substantially parallel to the planar surface of the reference member with the flange facting away from the reference member, the diaphragm being affixed to the reference member along the flanged periphery to define an interior region, the interior region of the diaphragm on the flange side being subjected to pressures to be measured and of a thickness such as to undergo deflection, the interior region of the diaphragm on the side facing the reference member having a concave curvature corresponding to the inverse of the deflection for a peripherally secured deflectable planar member, and the concave curvature tending to become substantially planar when deflected toward the reference member, wherein the concave depth in the diaphragm is of the order of 5-50 microns;
the reference member including at least one thin planar electrode on the surface thereof in an interior region and the diaphragm including in the interior region at least one thin planar electrode on the surface thereof such that the capacitor thereby formed changes with applied pressure and wherein the reference member acts as a planar backup surface for engagement against the planar surface of the deflected diaphragm in the event of excess deflection pressure;
bonding means of up to 10 microns in height at the flanged periphery coupling the reference member to the diaphragm; and
including in addition a peripheral glass spacer layer between the reference member and diaphragm, reference electrodes on the diaphragm and reference member, a glass layer on the reference element corresponding in thickness to the spacer layer and overlying the planar electrode thereon, and a thin sealing glass layer overlying the reference electrode on the diaphragm.

21. The sensor of claim 20 above, wherein the reference member and diaphragm are fabricated from a brittle elastic material from the class including ceramic, glass, fused quartz, silicon, and semiconductor material.

22. A pressure transducer comprising:

a reference member having a planar surface, the reference member being substantially non-bending under the pressures being sensed;

a pressure sensing diaphragm fabricated from semiconductor material having a flanged periphery disposed closely adjacent and substantially parallel to the planar surface of the reference member with the flange facing away from the reference member, the diaphragm being affixed to the reference member along the flanged periphery to define an interior region, the interior region of the diaphragm on the flange side being subjected to pressures to be measured and of a thickness such as to undergo deflection, the interior region of the diaphragm on the side facing the reference member having a concave curvature corresponding to the inverse of the deflection for a peripherally secured deflectable planar member, and the concave curvature tends to become substantially planar when deflected toward the reference member, wherein the diaphragm contains at least one piezoresistive element diffusive into the concave surface of the diaphragm that changes resistance in response to the deflection of the diaphragm under the influence of the pressure and wherein the concave depth in the diaphragm is of the order of 5-50 microns;

the reference member fabricated from material that closely matches the thermal coefficient of expansion of the diaphragm material; and further including bonding means of up to 10 microns in height at the flanged periphery coupling the reference member to the diaphragm.

23. The sensor as set forth in claim 22 above, wherein the diaphragm when deflected toward the reference member tends to become substantially planar and wherein the reference member acts as a planar backup surface for engagement against the planar surface of the deflected diaphragm in the event of excess deflection pressure.

24. The sensor as set forth in claim 23 above, wherein the semiconductor material is silicon, and wherein there are a plurality of piezoresistive elements on the diaphragm.

* * * * *

UNITED STATES PATENT AND TRADEMARK OFFICE
CERTIFICATE OF CORRECTION

PATENT NO. : 5,134,887

DATED : August 4, 1992

INVENTOR(S) : Robert L. Bell

It is certified that error appears in the above-identified patent and that said Letters Patent is hereby corrected as shown below:

Column 12, line 11, "deflation" should read --deflection--.
Column 14, lines 5 and 6, "thereabove" should read --thereabout--; line 29, "facting" should read --facing--.
Column 15, line 23, "diffusive" should read --diffused--.

Signed and Sealed this

Twenty-sixth Day of October, 1993

Attest:

BRUCE LEHMAN

*Attesting Officer*     *Commissioner of Patents and Trademarks*